(12) United States Patent
Pajestka et al.

(10) Patent No.: US 10,395,486 B2
(45) Date of Patent: Aug. 27, 2019

(54) DEVICE FOR DETECTING SURROUNDINGS

(71) Applicant: Kevin Pajestka, Hautzendorf (AT)

(72) Inventors: Kevin Pajestka, Hautzendorf (AT);
Markus Raffer, Graz (AT)

(73) Assignee: Kevin Pajestka, Hautzendorf (AT)

( * ) Notice: Subject to any disclaimer, the term of this patent is extended or adjusted under 35 U.S.C. 154(b) by 0 days.

(21) Appl. No.: 14/759,326

(22) PCT Filed: Jan. 7, 2014

(86) PCT No.: PCT/AT2014/050003
§ 371 (c)(1),
(2) Date: Jul. 6, 2015

(87) PCT Pub. No.: WO2014/107754
PCT Pub. Date: Jul. 17, 2014

(65) Prior Publication Data
US 2015/0356837 A1    Dec. 10, 2015

(30) Foreign Application Priority Data

Jan. 8, 2013   (AT) .................................... A 16/2013
Nov. 25, 2013  (AT) ............................. A 50777/2013
Dec. 2, 2013   (AT) ............................. A 50788/2013

(51) Int. Cl.
*G09B 21/00*     (2006.01)
*G08B 3/10*      (2006.01)
(Continued)

(52) U.S. Cl.
CPC ............... *G08B 3/10* (2013.01); *A61H 3/061* (2013.01); *G09B 21/001* (2013.01); *A61H 3/068* (2013.01);
(Continued)

(58) Field of Classification Search
CPC .... G08B 3/10; G08B 21/0446; G08B 21/043; A61H 3/061; A61H 2201/5084;
(Continued)

(56) References Cited

U.S. PATENT DOCUMENTS 6,671,226 B1    12/2003  Finkel
7,706,212 B1 *   4/2010  Campbell .............. A61H 3/061
                                                        367/116
(Continued)

FOREIGN PATENT DOCUMENTS

DE    10125183    3/2002
DE    10334009    2/2005
(Continued)

OTHER PUBLICATIONS

PCT International Preliminary Report on Patentability and Written Opinion for PCT/AT2014/050003, (English translation) dated Jul. 23, 2015. 7 pages.
(Continued)

*Primary Examiner* — Dhaval V Patel
(74) *Attorney, Agent, or Firm* — Joseph E. Maenner; Maenner & Associates, LLC (57) ABSTRACT

The invention relates to a device for detecting an environment, wherein the device includes at least one sensor unit, as well as at least one evaluation unit, wherein the sensor unit includes at least one distance sensor, as well as at least one position sensor, by means of which position sensor the spatial position of the at least one sensor unit, or the at least one distance sensor in relation to a horizontal plane can be determined, and wherein distance data from the distance sensor are only recorded when the at least one position sensor registers an acceptable position of the at least one distance sensor, or the distance data of the at least one distance sensor are only transmitted to the at least one
(Continued)

evaluation unit when the at least one position sensor registers an acceptable position of the at least one distance sensor, or the distance data determined by the at least one distance sensor are recorded together with the associated position data, and the evaluation unit generates at least one virtual image of the environment recorded by the at least one distance sensor based on the distance data, taking the position data into account, if applicable.

25 Claims, 3 Drawing Sheets

(51) Int. Cl.
  *A61H 3/06* (2006.01)
  *G08B 21/04* (2006.01)
(52) U.S. Cl.
  CPC ............. *A61H 2201/165* (2013.01); *A61H 2201/5023* (2013.01); *A61H 2201/5048* (2013.01); *A61H 2201/5061* (2013.01); *A61H 2201/5064* (2013.01); *A61H 2201/5069* (2013.01); *A61H 2201/5084* (2013.01); *A61H 2201/5097* (2013.01); *G08B 21/043* (2013.01); *G08B 21/0446* (2013.01)
(58) Field of Classification Search
  CPC .... A61H 2201/5097; A61H 2201/5064; A61H 3/068; A61H 2201/5023; A61H 2201/5069; A61H 2201/165; A61H 2201/5061; G09B 21/001
  USPC ........................................................ 340/4.14
  See application file for complete search history.

(56) References Cited

U.S. PATENT DOCUMENTS

| 2006/0129308 A1* | 6/2006 | Kates ................... A61H 3/061 |
| | | 701/532 |
| 2009/0122648 A1 | 5/2009 | Mountain |
| 2012/0062357 A1* | 3/2012 | Slamka ................. G01C 21/20 |
| | | 340/4.11 |

FOREIGN PATENT DOCUMENTS

| DE | 102010002744 | 9/2011 |
| JP | H06294658 | 10/1994 |
| KR | 20100127007 | 12/2010 |
| WO | WO 199740403 | 10/1997 |
| WO | WO 2010125096 | 11/2010 |
| WO | WO 2012/059269 | 5/2012 |

OTHER PUBLICATIONS

Ulrich, Iwan, "The Guide Cane. A Computerized Travel Aid for the Active Guidance of Blind Pedestrians". The University of Michigan College of Engineering, Aug. 1997. 114 total pages broken into 5 separate files due to size.
http://mars.jpl.nasa.gov/mer/mission/tl_surface_nav.html. Date unknown.
Office Action for Austrian Patent Application A 141/2012, dated Jul. 13, 2012, with relevant English translation.
Office Action for Austrian Patent Application A 50777/2013, dated Aug. 14, 2014, with relevant English translation.
Office Action for Austrian Patent Application A 50788/2013, dated Nov. 13, 2014, with relevant English translation being identical to that of A 50777/2013.
Office Action for Austrian Patent Application A 16/2013, dated Jul. 1, 2013, with relevant English translation.

* cited by examiner

DEVICE FOR DETECTING SURROUNDINGS

CROSS-REFERENCE TO RELATED APPLICATION

The present application is a U.S. National Stage application of POT application PCT/AT2014/050003, filed on Jan. 7, 2014, which claims priority from Austrian Patent Application A 50788/2013, filed on Dec. 2, 2013, Austrian Patent Application A 50777/2013, filed on Nov. 25, 2013, and Austrian Patent Application A 16/2013, filed on Jan. 8, 2013, all of which are incorporated herein by reference in their entireties.

FIELD OF THE INVENTION

The invention relates to a device for detecting an environment.

BACKGROUND OF THE INVENTION

Visually impaired persons generally orient themselves with the aid of a white cane and the haptic perception of the collisions of the tip of the white cane with the environment. For this, guidance systems are known from the relevant literature that are capable of providing very suitable guidance for blind persons in train stations, on platforms, or elsewhere, by means of a periodic arrangement of floor elements, for example. These methods are less suitable for people with little experience and having physical handicaps, or, respectively, in a natural, in particular rural, environment. Furthermore, interaction with the environment is compromised by the use of a white cane.

Moreover, rescue workers from organizations such as the fire department, military, etc. are frequently confronted with situations in which it is difficult to orient visually, such as at nighttime or in smoke filled buildings.

With the known devices, the spatial scanning of the environment is left up to the user. If this user is also limited in terms of his mobility, then there are significant sources of danger, which time and again result in harmful accidents. Furthermore, the scanning of the environment with the white cane can only occur sequentially, which can lead to critical situations, particularly in changing environments, this being even in the case of an escalator. Additionally, the edges of carpets, for example, or comparably low, but relevant, obstacles, are often not detected.

BRIEF SUMMARY OF THE PRESENT INVENTION

An objective of the invention is to detect the environment in a dynamic manner, or, respectively, to reliably detect environmental situations.

In particular, an object of the invention is to enable a detection of this type for handicapped persons, as described above, i.e. for persons whose perceptions are compromised per se and/or by the environmental conditions.

This objective is achieved by means of a device specified in the introduction in that the device comprises:
  at least one sensor unit, and
  at least one evaluation unit,
wherein the sensor unit comprises:
  at least one distance sensor, and
  at least one position sensor, by means of which position sensor, the spatial position, i.e. preferably at least the tilting of the at least one sensor unit, or the at least one distance sensor, respectively, can be determined in relation to a horizontal plane, and wherein
  distance data are only recorded by the at least one distance sensor when the at least one position sensor detects an acceptable position of the at least one distance sensor, or
  distance data from the at least one distance sensor are transmitted to the at least one evaluation unit when the at least one position sensor has detected an acceptable position of the at least one distance sensor and/or sensor unit, or
  the distance data determined by the at least one distance sensor are recorded together with the associated position data,
and the evaluation unit generates a virtual image of the environment recorded by the at least one distance sensor, based on the distance data, taking into account the position data, if applicable.

Likewise, the invention is achieved with a device specified in the introduction, in which the device comprises, in accordance with the invention:
  at least one sensor unit, and
  at least one evaluation unit,
wherein the sensor unit comprises:
  at least one distance sensor, and wherein the device comprises at least one acceleration sensor, by means of which at least one acceleration sensor, acceleration data can be determined for the at least one sensor unit, or the at least one distance sensor and/or an at least one position sensor that may be present in the device.

With a virtual image it is possible to depict the environment detected by the device according to the invention such that the device enables to user to imagine an "image" of his environment, despite impaired vision and/or other limitations. This "virtual" image can be converted by the device in a suitable manner, into a form that is perceivable for the user, as shall be described in detail below, such that the user is able to create an actual image of the environment via the corresponding virtual image that has been "scanned" appropriately.

In order to generate a virtual image, wherein this image is naturally a dynamic image when the user and/or the device is in motion, which changes permanently, the environment is scanned with one or more distance sensors, and also with one or more position sensors, which record the respective positions of the distance sensors, and a linking of the distance sensor system to the position sensor system occurs in the manner described above, such that a virtual image, or stationary, in defined time intervals, virtual images, respectively, of the environment can be generated.

The generation of "a virtual image" is not to be understood to mean that only one virtual image is generated, but rather, that a virtual image is generated at a defined point in time, as well as—with an activated device—continuously, e.g. in constant time intervals, this virtual image is recorded anew, such that with a changing environment, whether this is because the environment itself changes and/or because the device is in motion, the virtual image also changes dynamically, in a corresponding manner.

By linking the distance sensor(s) to the position sensor(s) it is possible, for example, to prevent unacceptable positions of the at least one distance sensor from affecting the determination of the virtual image(s), or taking into account the respective position of the at least one distance sensor/sensor unit at the point in time of the distance measurement in the determination of the virtual image.

It is of particular advantage for the device according to the invention when it furthermore comprises at least one acceleration sensor, by means of which at least one acceleration sensor acceleration data of the at least one sensor unit, or the at least one distance sensor and/or the at least one position sensor, respectively can be determined.

In this manner, acceleration data can likewise influence the determination of the virtual image(s), and make these image(s) more precise accordingly, or cause the sensors to function only under certain acceleration conditions. Data from the at least one distance sensor and/or the at least one position sensor can thus be linked to the acceleration data.

It is provided, in particular, that the at least one position sensor is configured to identify the spatial position of the at least one sensor unit, or the at least one distance sensor and/or the at least one acceleration sensor, respectively. The latter can be achieved, for example, in that all of the sensors are disposed in the sensor unit.

Furthermore, it is then advantageous when the at least one distance sensor and/or the at least one position sensor are/is only active, or data from the at least one distance sensor and/or the at least one position sensor are only transmitted to the evaluation unit, when an acceleration is measured by the at least one acceleration sensor that is not equal to zero.

In this manner, when the device, or at least the at least one distance sensor and/or the at least one position sensor are not moved, and are thus stationary, the sensor, or these sensors, respectively, can be shut off in order to conserve energy. When the sensors are not moving, the environment does not change, such that a determination of the environment is normally not necessary, or, respectively, after a first determination, a further determination of the environment is first again necessary when the environment changes.

It can, however, likewise be provided that the at least one evaluation unit only takes distance data from the at least one distance sensor into account when these data are determined at a point in time at which the acceleration has a value not equal to zero. In this case, the sensors are permanently active, but only the sensor data determined at specific points in time under appropriate conditions are taken into account.

As a rule, it may be provided that the distance data and/or the position data and/or acceleration data are recorded collectively and are processed collectively in the device.

In a concrete embodiment of the invention, the at least one distance sensor only supplies distance data, or the measured distance data are only taken into account by the evaluation unit, when the at least one distance sensor is in a defined position, in particular in a defined position in relation to a horizontal plane. There is one, or normally numerous or many, such defined positions, in which the distance data can be taken into account, or are determined.

If the at least one distance sensor is located in one such defined position at some point in time, the at least one distance sensor is active and measures at this point in time, or in the case of a sensor that is permanently active, its data are only taken into account at such points in time in which the at least one distance sensor is located in a defined position. If the at least one distance sensor is not in one of the defined positions, then it does not measure, or its measurement is not taken into account.

This is advantageous, for example, when the at least one distance sensor is incorporated in a shoe of a user.

With certain applications, such as when the distance sensor is incorporated in a shoe, the at least one distance sensor may provide faulty measurements when this sensor is not level. If, for example, the at least one distance sensor is directed downward, then it detects at least a portion of the path, and not exclusively objects and obstacles located in front of the user. Likewise, when the distance sensor is directed upward, certain obstacles, such as lower obstacles at a certain distance, may not be registered, or reliably registered. This problem can be reliably resolved when only the measurements of the at least one distance sensor that are made when the sensor is in a level position are used.

The aforementioned defined position is thus the 0° position in relation to the horizontal plane in the case of a shoe, for example, in which the device, or at least a portion thereof, is incorporated. However, the "defined position" is normally not defined exclusively by exactly one angular value. In keeping with the example of the shoe, the defined position could also lie within an angular range in which the distance data are measured or taken into account. Thus, with the shoe it may also be advantageous when distance measurements are also taken into account when made at a negative angle, thus pointed downward. Typical values for the angle lie between 0° and −30°. An upcoming slope (climb, etc.) can be detected in this manner.

Alternatively, it may be provided that distance measurements made at a positive angle, thus directed upward, are also taken into account. Typical values for the angle lie between 0° and −30° here. An upcoming incline (climb, etc.) can be detected in this manner. Other objects and obstacles, which are not, or not only, located close to the ground, but rather, higher objects, etc. such as mailboxes, for example, at breast height, can also be detected in this manner.

It is particularly advantageous when distance measurements made in both directions around a particular specified position, thus tiltings of the at least one distance sensor, are taken into account, and preferably the tilting of the at least one distance sensor is taken into account in the determination of the one or more virtual images.

In general, and in particular for the use of the device in combination with a shoe, as described above, a particularly preferred defined position of ±30° about the 0° position, in particular a defined position of ±20° about the 0° position, has proven to be effective. If the at least one distance sensor is thus at an incline of ±30°, or ±20°, respectively, to the horizontal plane, then the distances determined by the at least one distance sensor to the objects, obstacles, etc. detected by the at least one distance sensor are taken into account, and the respective measured angle of inclination influences, preferably, the determination of the at least one, preferably numerous, virtual images.

With other uses, however, other positions of the distance sensors can also lead to useful results, such that, when used in industrial applications, a 360° measurement may also be useful.

Depending on the use, the device according to the invention thus exhibits the appropriate, advantageous detection range, or is preferably programmable, and thus adjustable.

It is particularly preferred when the at least one sensor unit comprises two or more distance sensors, which are preferably disposed in an array. By using numerous distance sensors, which are preferably disposed in a defined region (array), the detection range of the environment and/or the precision of the distance measurement, and thus the determination of the virtual environment, can be improved.

The virtual image or images is/are primarily located in the device, in particular in the evaluation unit. These images comprise data, for example, that describe distances to, or the positions of, objects or obstacles, and possibly the shapes thereof as well, in an abstract form.

In order to then make is possible for a user of the device to actually orient himself in this virtual environment, it is preferably provided that the device furthermore comprise at least one feedback unit, which emits at least one feedback signal that is dependent on the at least one virtual image of the environment determined by the evaluation unit.

This feedback unit can, for example, be a distinct structural unit, or assembly, respectively, or it is integrated in the evaluation unit, or the evaluation unit also assumes the function of the feedback unit.

A depiction of the environment that can be perceived by the user can be created via the feedback unit and the feedback signals that can be perceived by the user, which changes accordingly when, for example, the user moves, these changes then being depicted by the changing feedback signals.

In one or more concrete embodiments of the invention, it is provided that the at least one feedback signal is one or more of the following feedback signals:
acoustic feedback signal;
visual feedback signal;
haptic feedback signal;
neurostimulating feedback (e.g. when incorporated in prostheses, orthotics, etc.);
electrical current pulses.

By way of example, a haptic feedback signal is emitted as a vibration signal, or a vibration, or as perceptible electrical current pulses, or perceptible current pulses. The distance to an obstacle etc. can be represented by the strength of the signal, for example, and the position of the obstacle etc. can be indicated by the location of the signal (e.g. on the left side or right side of the body of the user).

By way of example, a feedback signal, e.g. an acoustic feedback signal, is emitted as a mono-, stereo-, or 3D-signal.

A signal of this type, in particular a stereo or 3D (surround) signal can be adapted accordingly, in order to indicate spatial obstacles particularly well.

The emission of stereo signals is not limited to acoustic signals thereby, and, for example, a haptic signal can also be emitted as a "stereo" signal, in that, depending on the obstacle, the signal is emitted on the left or the right, or is emitted more strongly on one of these two sides.

It is particularly preferred when the feedback signal varies over time with respect to one or more of the following values, or that feedback signals that differ over time vary in one or more of the following variables: frequency of the feedback signal, amplitude of the feedback signal, purity (noise) of the feedback signal, duration of the feedback signal, strength of the feedback signal, volume of the feedback signal, brightness of the feedback signal.

Alternatively, or preferably, it may also be provided that the feedback signal is a function of the distance of an obstacle to the at least one distance sensor, and/or is a function of the shape, e.g. the height, depth or width of an obstacle.

In a concrete, advantageous embodiment of the device according to the invention, it is provided that the at least one sensor unit be integrated in a shoe. The incorporation in a shoe enables a wearer of the shoe to orient himself in an environment in a simple manner, and in a manner that can be easily carried, with a device according to the invention. Preferably, only the sensor unit is incorporated in the shoe thereby, i.e. it is either permanently incorporated therein, or it is incorporated such that it can be removed therefrom, and the rest of the device is located, e.g. on the body of the user, such that the evaluation unit and feedback unit are preferably carried on the body of the wearer of the shoe. It is, however, also possible to disposed the entire device in the shoe.

It may also be practical to vary the feedback signal in relation to the determined acceleration, such that, e.g. when the acceleration is low, a signal having, e.g., a lower frequency is generated, having a "more peaceful" effect on the user.

It is preferred thereby that the sensor unit be incorporated in a front region of the shoe.

It is likewise convenient when the at least one acceleration sensor is integrated in the shoe.

In another device of the invention, it is provided that at least a portion of device, preferably the entire device, is incorporated in a cane, e.g. in a white cane, a walking cane, a guide cane, or a part of such a cane.

It may likewise be provided that at least a portion of the device, or the entire device, can be attached to, or is incorporated in, a head covering, e.g. a helmet, or an article of clothing, e.g. eyeglasses, belt, etc., a prosthesis, or a cellular telephone.

The device may also find use in conjunction with production lines (conveyor belts, etc.), or machines and/or robots, used, for example, in automotive engineering.

By way of example, it is provided that the at least one distance sensor functions by means of sound waves, e.g., is an ultrasound sensor.

Alternatively, or in addition thereto, it may be provided that the at least one distance sensor functions by means of electronic and/or magnetic waves, in particular electromagnetic waves, e.g., is a radar sensor, or makes use of radio waves, in particular radio waves greater than 1 MHz.

Alternatively, or in addition thereto, it may be provided that the at lest one distance sensor is an optical sensor, which functions, for example, in the non-visible range of the wavelength spectrum, or in the visible range of the wavelength spectrum.

The invention further relates to a shoe having the aforementioned device, which is incorporated in the shoe, or, respectively, only portions of the device are disposed in the shoe, or incorporated therein. At least one sensor unit having the distance sensor(s) and at least one position sensor are disposed in the shoe thereby, while all of the other components of the device can likewise be disposed in the shoe, but are preferably disposed outside of the shoe, for reasons of structural space. The feedback unit is preferably always disposed outside of the shoe.

Moreover, the invention relates to a cane, in particular a walking cane or white cane, having the device described above, which is disposed in the cane. As in the case with the shoe, the sensor unit is incorporated in turn in the cane, and with a cane there is the possibility of preferably incorporating the entire device therein.

Furthermore the invention also relates to a handle for a cane, in particular for a walking cane or a white cane, having a device, described above, or parts thereof, in particular a sensor unit for the device described above.

BRIEF DESCRIPTION OF THE DRAWINGS

The invention shall be described in greater detail below, based on the drawings. Therein.

DETAILED DESCRIPTION OF THE INVENTION

The figures show two exemplary embodiments in which the device is used as a device for warning persons, in particular handicapped persons, of obstacles. In particular, such devices are particularly suitable for visually impaired persons. A device of this type enables a better orientation and safeguards against accidents.

Figure 1:
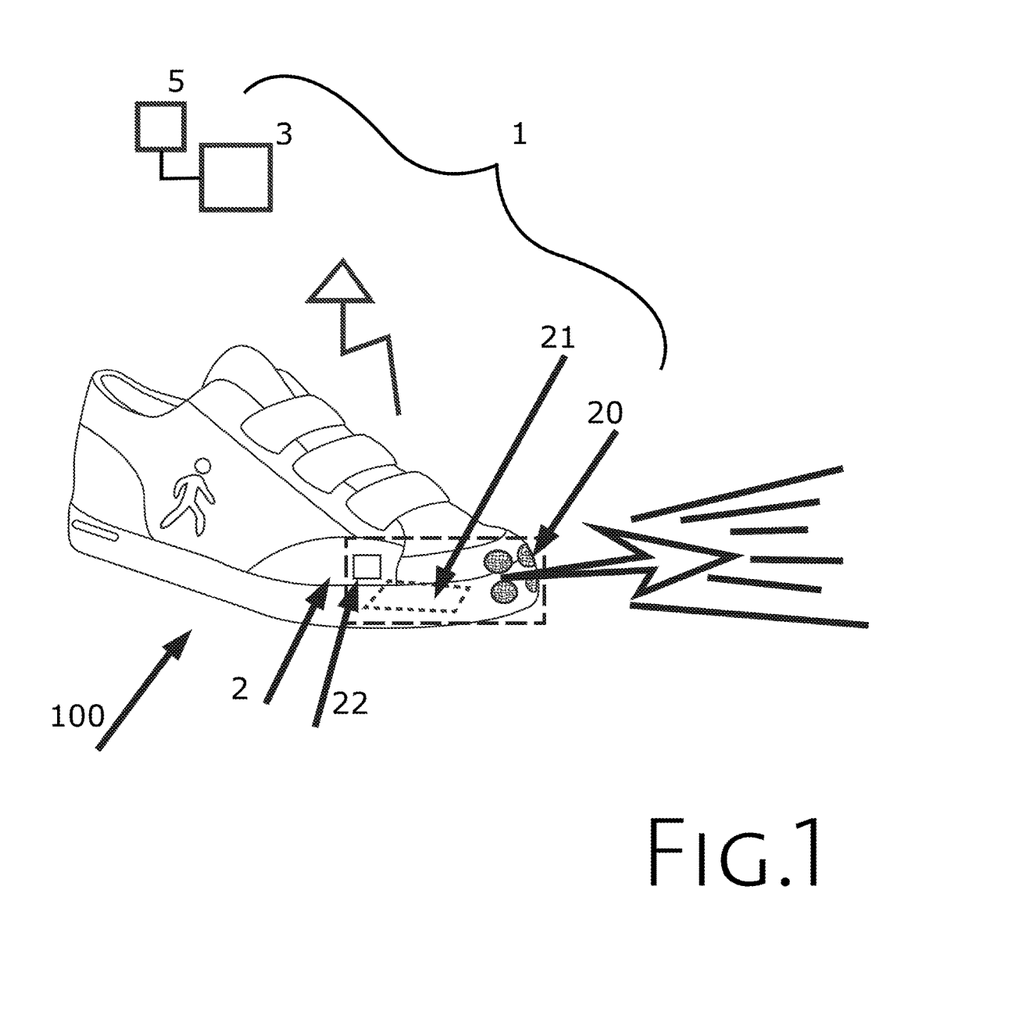
FIG. 1 shows a shoe according to the invention, having a device according to the invention.

FIG. 1 shows a shoe 100, in which parts of a device 1 according to the invention are incorporated. Concretely, a sensor unit 1, having an array of distance sensors 20 as well as a position sensor, with which the position of the distance sensors 20 can be determined, in particular their tilting in relation to a horizontal plane, is located in the shoe. The distance sensors preferably lie in a horizontal plane when the shoe is in such a plane. The distance sensors 20 are preferably located in a front region, and detect the environment in a region in front of the shoe.

Optionally, an acceleration sensor 22 can also be disposed in the shoe, preferably in the sensor unit 2.

The position sensor 21 identifies the position of the shoe (and thus the distance sensors 20) in relation to the inertial system defined by the gravity, and it is also possible to measure the direction of movement, among other things, with the acceleration sensor 22. The space in front of the shoe is thus scanned from different known directions, and can be computed as a multi-dimensional pattern (virtual image). In an advantageous embodiment, in which typical radar processes are used, it is also possible to perceive relative speeds of moving objects thereby.

The distance sensor(s) can be ultrasound sensors, optical sensors or radar sensors, etc., or, with numerous distance sensors, two or more types of sensors may be used.

The recorded data are then forwarded to a central unit, i.e. an evaluation unit 3 of the device 1, by means of a wireless or line transmission, said evaluation unit 3 being worn on the body of the user, for example.

FIG. 1 furthermore shows, schematically, an additional feedback unit 5, which shall be explained below.

Figure 2:
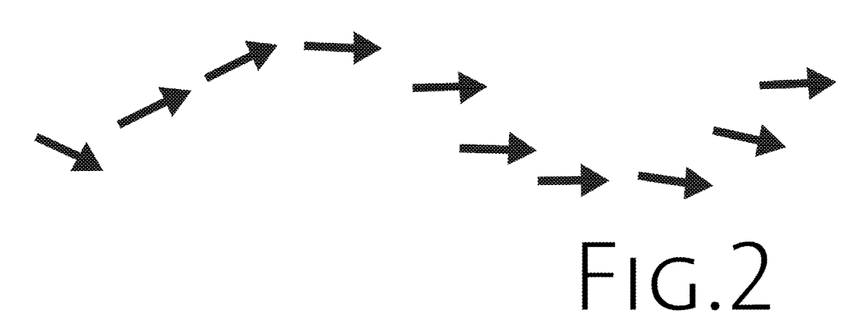
FIG. 2 shows the course of the direction vector when walking with a shoe.

FIG. 2 shows, by way of example, the course of the directional vector, i.e. the changing position of the distance sensors during a measurement, i.e. when a user moves.

Figure 3:
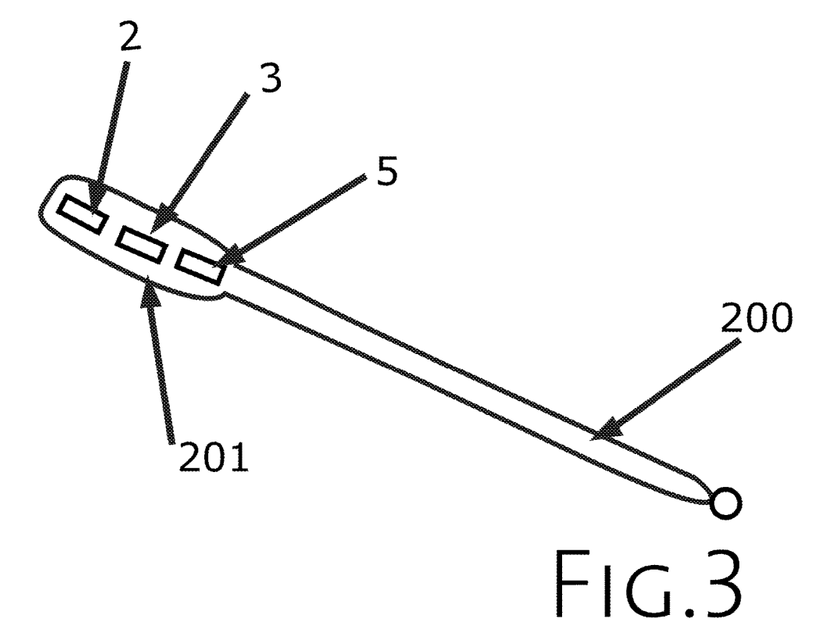
FIG. 3 shows a cane having a device according to the invention incorporated therein.

FIG. 3 shows a cane, e.g. a white cane 300, having a handle 201. The device, thus at least the sensor unit 2 having distance sensors 20, preferably also having a position sensor 21 and/or an acceleration sensor 22, is incorporated in the cane 200 or in the handle 201. Preferably, the evaluation unit 3 and, e.g., the feedback unit 5 are also incorporated in the cane 200 or the handle 201.

By way of example, the feedback unit 5 comprises a vibration transmitter. The cane 200 in accordance with FIG. 3 has two modes of operation: Firstly, it can be used as a pointer, indicating the direction in which the feedback to the user occurs. The measurement of the spatial direction occurs via the position sensor 21 thereby. Secondly, the white can is suitable for use as a simple feedback system, by means of which the distance to obstacles is indicated, by means of the strength and frequency of the vibration, in a precisely indicated spatial direction.

Furthermore, the position sensor 21 can detect an undesired positioning of the user, and can thus be used as the basis for an alarm in the case of a fall and an unvarying change in position.

Figure 4:
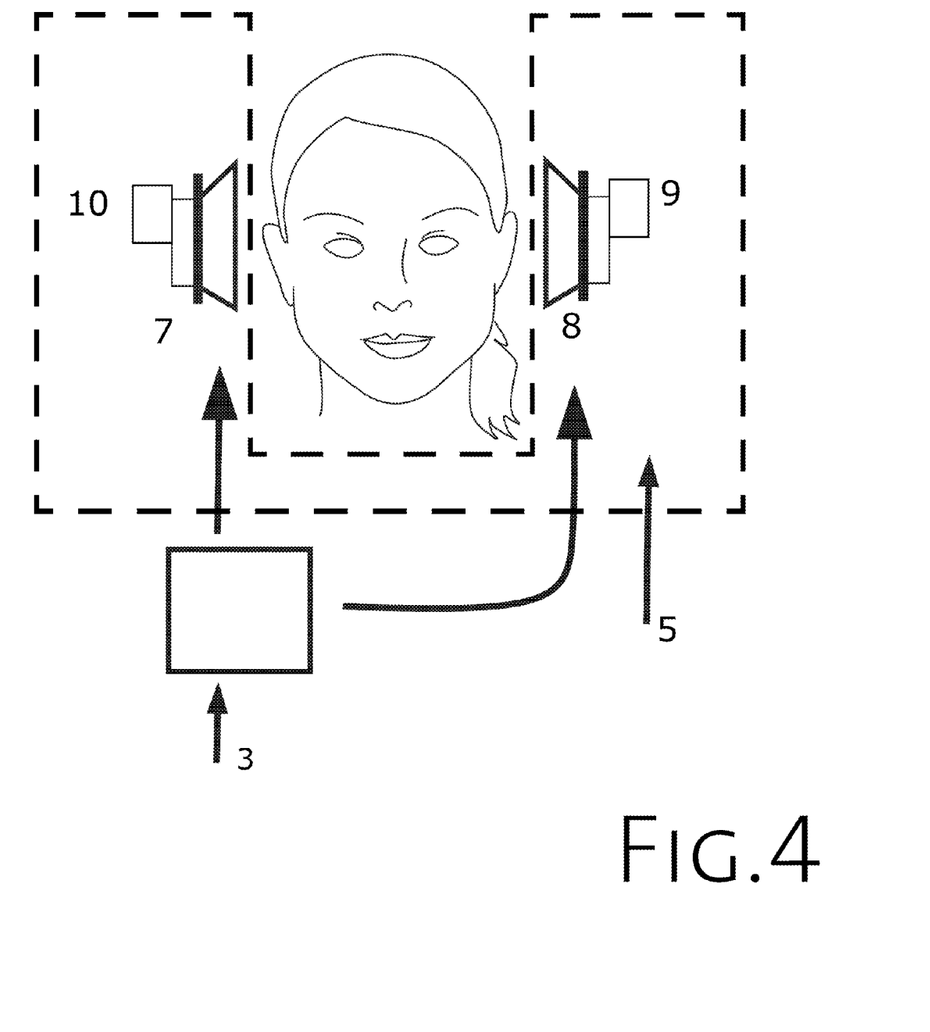
FIG. 4 shows an example of an acoustic feedback signal.

An advantageous and convenient feedback regarding the determined environment is depicted in FIG. 4. FIG. 4 shows a feedback unit 5, composed of a feedback generation unit, not shown, or integrated in the evaluation unit, or implemented therewith, as well as two acoustic converters 7, 8 connected thereto, as well as actuators, such as loudspeakers 9, 10, which depict the depiction of the environment to the user via acoustic signals. This feedback regarding the environment is composed, on one hand, of acoustic signals, which depict the environment acoustically, via variations in the volume, the pitch, or a reverb effect added thereto, such that a mapping of this environment is obtained having the greatest possible spatial quality.

Thus, an "image" of the environment relevant to a user can be determined, and can be provided to the user, and furthermore, the presence or appearance of obstacles, such as depressions, rises, etc. can be detected.

Furthermore, exceptional situations, such as a fall or an unacceptable position can be detected.

Regarding the distance sensors, an exemplary implementation shall be discussed below. Acoustic distance warning systems are known from automotive electronics, which are capable of measuring a distance by means of the reflection of an ultrasound or optical signal, and the measurement of the time required therefor. By disposing numerous sensors in an axis, or by disposing the sensors in a plane, it is possible to detect the direction in the plane or space by using a correlative measurement process. Different embodiments having, in each case, one or more transmitters and one or more receivers, are conceivable thereby.

In general, independently of the type of respective distance sensor, a distance sensor is composed of at least one transmitter and one receiver. The transmitter emits a signal, e.g. an ultrasound distance sensor transmits an ultrasound signal, this signal is reflected and is then received by the receiver. The transmitter and receiver can be separate units, but it is also possible for the transmitter and receiver to form a structural unit. A distance sensor typically comprises one transmitter and one receiver, but two or more transmitters and/or two or more receivers may also be provided.

The distance sensors, such as those in a shoe, should preferably also serve to provide a warning prior to a slope, such as an incline. However, a measurement with the distance sensors cannot occur by means of a typical walking movement in every position, because, as can be seen readily in FIG. 2, in certain positions of the shoe, the floor would be detected as an obstacle. This problem can be resolved in that the distance sensors measure only as a function of the position, as described in general in the introduction in conjunction with this invention, or distance data are only used when the distance sensors assume a certain position.

By way of example, the device can be adjusted, e.g. programmed, such that a query of the distance sensor data only occurs when the shoe is in a level position. It is also possible, however, that a position deviating from the level position can be taken into account, as described above, in order to determine whether there is "no" floor in front of the shoe and thus, there is, e.g., a depression, step, etc.

As with before, the interconnected acceleration sensor can be used for additional support and analysis.

If the distance measurement system then reports an obstacle, when in a defined, e.g. level, position, then an acoustic (ticking, etc.), haptic and/or visible feedback and/or neurostimulating feedback and/or a current pulse, is emitted, and/or a speech output occurs.

The feedback can be emitted directly from a housing, in which the device, or a portion thereof, is accommodated, or it can be transferred by means of a remote module, such as a Bluetooth module, to an external module. This module is carried by the user, which can be connected to, or can communicate in a wireless manner with, a headset (FIG. 4), collar or similar acoustic/haptic output media.

With the present invention, in general the spatial direction of obstacles can also be determined not only from the travel time and phase relationship of echo signals, but also by means of a position sensor and/or acceleration sensor.

In the embodiment according to FIG. 3, the white cane, or a handle without a white cane, contains a position and acceleration sensor system. This sensor system detects the position of the handle or the white cane, and reports this spatial direction to the computer unit. The presence of obstacles or the distance to these obstacles in precisely this direction, indicated by the position of the handle, is then reported to the user by means of haptic, acoustic or optical signals.

The feedback itself occurs in the device, inside the handle itself, by means of vibrations, wherein the frequency and the sequence of the vibration indicates the position, distance and type of obstacle (i.e. an abrupt obstacle or a smooth transition).

The feedback system contributes to the overall image of the environment, which, via media, such as earphones, or speakers incorporated in an article of clothing, e.g. a collar, conveys, by means of echo and reverb effects, the presence of rises and depressions in the region of the direction of travel. Speech outputs are also conceivable as feedback.

If, therefore, the user hears a strong reverb effect on the left side in a stereo audio system, he can thus be warned of a depression, while a hard echo indicates, e.g., a rise, and the volume can be selected such that it is representative of the distance thereby.

According to the invention, warning signals are synthesized (e.g. ticking) if there are low environmental noises, but a warning is nevertheless necessary.

There are also sensors in the device that record and analyze (measure) the ambient noises, such that the system adjusts the volume of the acoustic feedback. One solution would thus be to process noises, when there are natural noises present, such as traffic sounds, etc., and to superimpose a reverberation or echo thereon in order to avoid interferences through additional noises.

The position sensor located in the shoes, for example, is furthermore suited to initiate distress calls upon detecting abnormal situations, and thus, for example, to call for help in the case of a blackout, falling down, etc. via suitable radio signals such as cellular telephone, GPS, etc.

The power supply can be obtained, for example, by means of induction technology.

A mechanical power supply is also conceivable, wherein the battery is recharged by the walking motion.

In the present application, position sensors are to be understood as position sensors such as those already being used in modern cellular telephones, smartphones etc. All of the embodiments discussed in the scope of the detailed description can be implemented with such position sensors. A position sensor of this type measures, for example, one, two or three global coordinates (x, y, z).

Furthermore, in the present application, a position sensor is also to be understood as an assembly in which the position sensor comprises at least one, preferably two or more, weight sensors:

In the exemplary case, in which the position sensor comprises exactly one weight sensor, or is a weight sensor, respectively, it is possible to measure—with, e.g. a weight sensor incorporated in a shoe or in a cane—whether the shoe or cane is located on the ground, and is loaded, accordingly, with a weight. In the case in which the shoe/cane is in contact with the ground, the at least one distance sensor takes measurements, or, respectively, its measurements are taken into account. If the shoe or cane is raised, then no weight is applied to the shoe/cane, the distance sensor takes no measurements, or its measurements are not taken into account in this case, but rather, the distance sensor begins to take measurements again when the weight sensor registers a weight load. In this example, the defined position of the at least one distance sensor is defined by a contact/resting of the shoe or cane on the ground.

The exemplary case, in which the position sensor comprises at least two or exactly two weight sensors, or is formed by (at least) two weight sensors, is particularly suited for a shoe. One weight sensor can be incorporated, for example, in a front region, the toe region, and a further weight sensor can be incorporated in the back region, e.g. in the heel region. In this manner, on one hand, it is possible to determine whether the shoe lies entirely on the ground (both weight sensors measure a weight load), the shoe is entirely raised, or the is loaded at only the toes or the heel. Accordingly, the direction of tilting of the shoe can also be determined (tilted downward, tilted upward, level), and this can be taken into account accordingly in the evaluation of the at least one distance sensor (or its measurement, i.e. whether or not it is measuring at a specific point in time).

The use of position sensors, in the proper sense, as they are installed in cellular telephones, etc., has the advantage that the position of the at least one distance sensor, and any other components, can be measured relatively precisely, in particular a tilting in relation to a horizontal plane.

The use of position sensors composed of one or more weight sensors has the advantage that these are easy to use (with regard to angular measurements and calculations) and the software is easy to implement.

The weight sensors can be pressure sensors or capacitive sensors, for example, in particular capacitive pressure sensors.

Aside from the use in a shoe or cane, as described above, it is generally possible to detect pressure and contact from a foot/head/hand with the weight sensors, such as the described pressure sensors, capacitive sensors, or capacitive pressure sensors.

As a rule, it may be provided that only one type of position sensor (a position sensor in the proper sense, or at least a weight sensor) is used. It is also possible, however, that both types of weight sensors are used.

The invention claimed is:

1. A device for detecting an environment, wherein the device comprises:
   at least one sensor unit, and
   at least one evaluation unit, wherein the at least one sensor unit comprises:
at least one distance sensor, and
at least one position sensor, by means of which at least one position sensor the tilting of the at least one distance sensor in relation to a horizontal plane, can be determined, and wherein a defined position lies only in an angular range of +/−30 degrees about the zero degree position with respect to a horizontal plane, wherein at least one of
distance data are only recorded by the at least one distance sensor when the at least one position sensor registers an acceptable position of the at least one distance sensor, and
the distance data determined by the at least one distance sensor are recorded together with the associated position data,
and the at least one evaluation unit generates at least one virtual image of the environment detected by the at least one distance sensor based on the distance data, and
wherein, when the at least one distance sensor is tilted outside the angular range of +/−30 degrees about the zero degree position with respect to the horizontal plane, the distance data is not recorded.

2. The device according to claim 1, characterized in that the device furthermore comprises at least one acceleration sensor, by means of which at least one acceleration sensor, acceleration data for the at least one sensor unit can be determined.

3. The device according to claim 1, characterized in that the at least one position sensor is configured for detecting the spatial position of at least one of the at least one sensor unit, the at least one distance sensor, and the at least one acceleration sensor.

4. The device according to claim 1, characterized in that data of at least one of the at least one distance sensor and the at least one position sensor are only transmitted to the evaluation unit, when an acceleration, not equal to zero, has been measured by the at least one acceleration sensor.

5. The device according to claim 1, characterized in that the at least one evaluation unit only takes distance data from the at least one distance sensor into account when these data are determined at a point in time at which the acceleration has a value that is not equal to zero.

6. The device according to claim 1, characterized in that distance data are only taken into account by the at east one evaluation unit, when the at least one distance sensor is in a defined position in relation to a horizontal plane.

7. The device according to claim 1, characterized in that the at least one sensor unit comprises two or more distance sensors, which are disposed in an array.

8. The device according to claim 1, characterized in that the device furthermore comprises at least one feedback unit, which emits at least one feedback signal based on the virtual image of the environment determined by the evaluation unit.

9. The device according to claim 8, characterized in that the at least one feedback signal is one or more of the following feedback signals:
acoustic feedback signal;
visual feedback signal;
haptic feedback signal;
neurostimulating feedback; and
electrical current pulse.

10. The device according to claim 9, characterized in that the haptic feedback signal is emitted as one of a vibration signal and a vibration.

11. The device according to claim 9, characterized in that the at least one feedback signal is emitted as one of a mono-, a stereo-, and a 3D-signal.

12. The device according to claim 8, characterized in that the at least one feedback signal varies over time with regard to at least one of the following variables: frequency of the at least one feedback signal, amplitude of the at least one feedback signal, purity of the at least one feedback signal, duration of the at least one feedback signal, strength of the at least one feedback signal, volume of the at least one feedback signal, and brightness of the at least one feedback signal.

13. The device according to claim 8, characterized in that the at least one feedback signal is a function of the distance of an obstacle to at least one of the at least one distance sensor and is a function of the shape of an obstacle.

14. The device according to claim 1, characterized in that at least one feedback signal is varied as a function of the determined acceleration.

15. The device according to claim 1, characterized in that the at least one sensor unit is integrated in a shoe.

16. The device according to claim 15, characterized in that the at least one sensor unit is incorporated in a front region of the shoe.

17. The device according to claim 15, characterized in that the at least one acceleration sensor Os integrated in the shoe.

18. The device according to claim 1, characterized in that at least a portion of the device is incorporated in a cane.

19. The device according to claim 1, characterized in that at least a portion of the device can be attached to, or is incorporated in, at least one of a head covering, an article of clothing, a prosthesis, and a cellular telephone.

20. The device according claim 1, characterized in that the at least one distance sensor functions by means of sound waves.

21. The device according to claim 1, characterized in that the at least one distance sensor functions by means of at least one of electronic waves and magnetic waves.

22. The device according to claim 1, characterized in that the at least one distance sensor is an optical sensor, which functions, in one of the non-visible range of the wavelength spectrum and the visible range of the wavelength spectrum.

23. A shoe having a device according to claim 1 disposed in the shoe, wherein at least the at least one sensor unit is disposed in the shoe.

24. A cane, in particular one of a walking cane and a white cane, having a device according to claim 1.

25. A handle for a cane, in particular for one of a walking cane and a white cane, having a device according to claim 1.

* * * * *